March 24, 1970 G. A. BEASLEY 3,501,842
METHOD AND APPARATUS FOR BLOCKING MULTIFOCAL LENS BLANKS
Filed Oct. 17, 1967 3 Sheets-Sheet 1
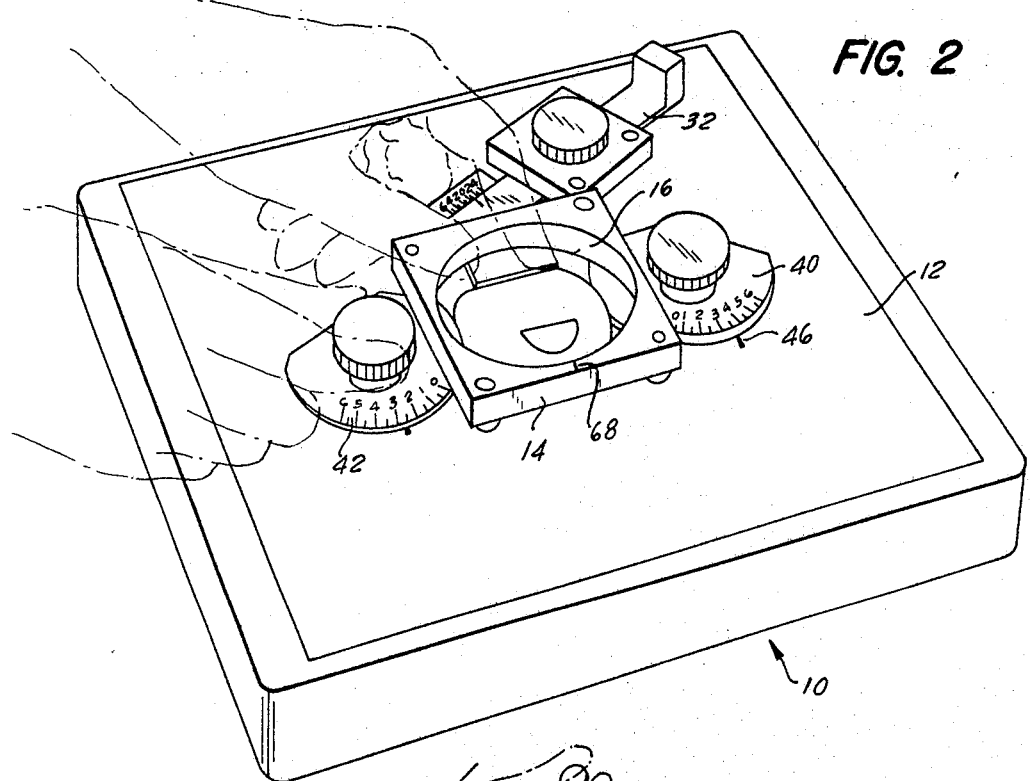
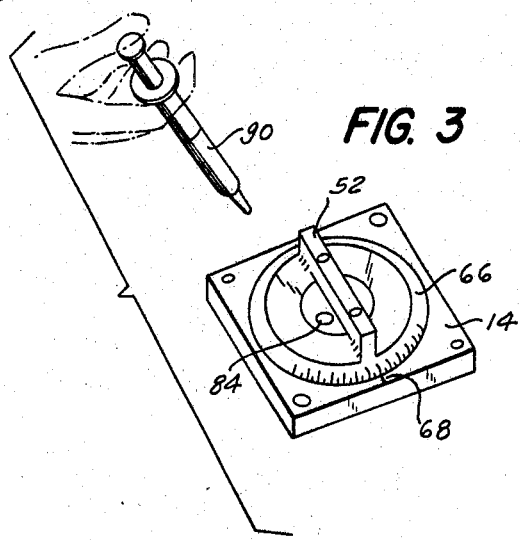
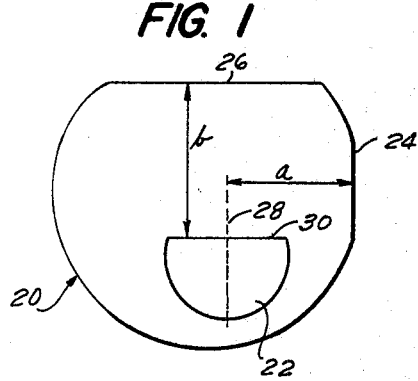
INVENTOR
GEORGE A. BEASLEY
BY
ATTORNEYS

United States Patent Office 3,501,842
Patented Mar. 24, 1970

3,501,842
METHOD AND APPARATUS FOR BLOCKING MULTIFOCAL LENS BLANKS
George A. Beasley, Fort Lauderdale, Fla., assignor to Univis, Inc., Fort Lauderdale, Fla., a corporation of Ohio
Filed Oct. 17, 1967, Ser. No. 675,967
Int. Cl. G01b *5/24;* B23q *17/04;* B23f *23/08*
U.S. Cl. 33—180                    6 Claims

ABSTRACT OF THE DISCLOSURE

A method and apparatus for blocking a lens blank which has edge referencing surfaces, the apparatus having means to accurately position the block immediately above the blank in a predetermined relationship to the prescribed optical and geometrical properties of the finished lens.

BACKGROUND AND SUMMARY OF THE INVENTION

This invention relates to an improved method and apparauts for blocking multifocal lens blanks that have been prereferenced by the manufacturer with respect to the reading segment for purposes of accurately locating the optical and mechanical centers and the cylinder and horizontal axes of the finished lens. Prereferenced lens blanks of the type employed with this invention are further described in pending U.S. patent application S.N. 520,173, filed Jan. 12, 1966.

In the manufacture of multifocal lenes having a reading segment thereon, the optical and mechanical centers and cylinder and horizontal axes must be accurately and precisely located in accordance with the particular prescription by the prescription shop. In this connection, the grinding and polishing operations are preformed with reference to the optical center and cylinder axis. These operations are generally facilitated by the securement of a block on the lens blank which is indexed relative to the optical properties following a visual alignment procedure requiring the exercise of skill and patience and the expenditure of a considerable period of time. The mechanical center and horizontal axis must also be located on the lens blank, and these properties are then utilized in the shaping of the final edge of the lens according to the prescription. Either a suitable peripheral holding device or another block is secured to the blank after being accurately indexed relative to the stated geometrical properties following another tedious visual alignment procedure.

It is, therefore, a principal object of this invention to provide an apparatus designed to quickly and efficiently block a multifocal lens blank by utilizing references which have been placed on the blank in a predetermined relationship to the reading segment. The apparatus, through the employment of the references which have been placed on the blank by the manufacturer, will eliminate the time consuming and error prone visual "markup" and sighting techniques, and at the same time will permit complete alignment for the blocking operation.

Briefly stated, the multifocal lens blank of the type utilized with this invention is provided with references which are indexed relative to the bifocal or reading segment for purposes of accurately locating the optical and mechanical centers and the cylinder and horizontal axes of the finished lens. Exemplary edge referencing comprises a pair of spaced referenced flats milled into the peripheral edge of the lens blank with one flat extending in a substantially vertical direction at a predetermined distance from the center of the upper edge of the reading segment and the other reference flat extending in a substantially horizontal direction at a predetermined distance from the upper edge of the segment while being disposed at a predetermined angle relative thereto. The apparatus of the present invention utilizes these edge references to index a block in a predetermined relationship to the desired optical or physical properties of the lens according to the particular lens prescription. The block is then secured or cemented to the lens blank and is subsequently utilized to hold the blank during the grinding and polishing or edging operations.

Generally, the apparatus of the present invention comprises a frame having a surface for supporting the lens, the surface having a designated center thereon, means on the frame to engage the references of the lens to accurately position the lens on the surface in relation to the designated center, and means for positioning a lens block immediately above the lens and accurately positioned in relation to the designated center.

Other objects and advantages will become apparent from the following detailed description and accompanying drawings.

BRIEF DESCRIPTION OF THE DRAWINGS

FIG. 1 is a front elevational view of a lens blank having edge reference flats ground or otherwise formed in the periphery;

FIG. 2 is a perspective view of the blocking apparatus of the subject invention;

FIG. 3 is a perspective view of a portion of the blocking apparatus showing the block holder positioned in the centering ring and adapted to receive an injection of bonding material;

DESCRIPTION OF THE PREFERRED EMBODIMENT

Figure 4:
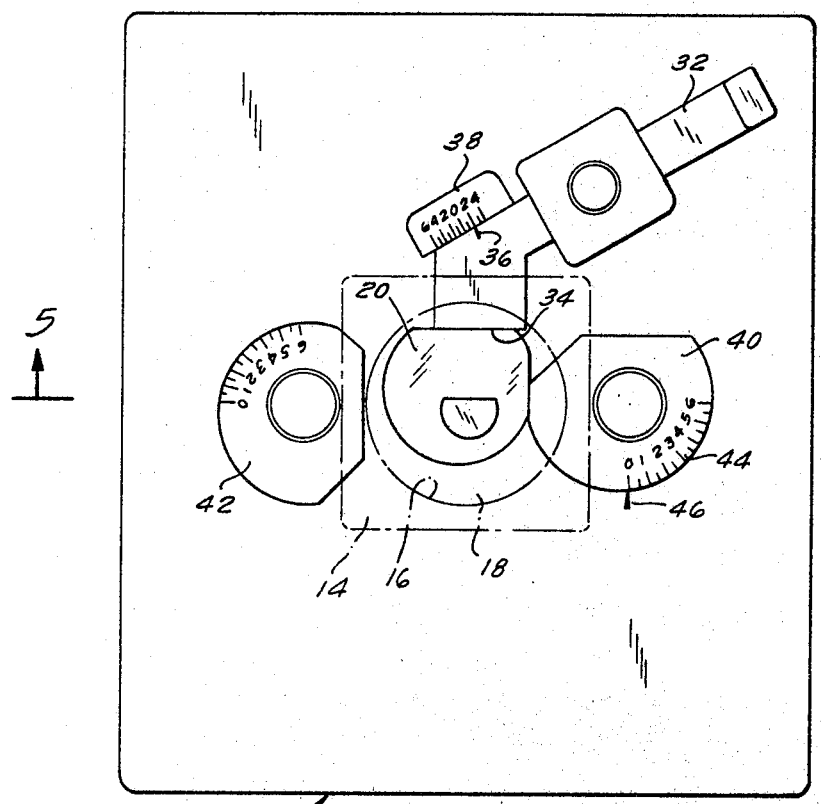
FIG. 4 is a top plan view of the blocking apparatus, the centering ring being shown in phantom lines.

Referring to the drawings the blocking apparatus of the subject invention is indicated generally at 10 and is designed to be utilized by a prescription shop for the purpose of blocking the edge referenced lens blank 20.

A lens blank of the type adapted to be utilized with the apparatus of the present invention is shown at 20 in FIG. 1. In the illustrated embodiment, the blank 20 includes a bifocal or reading segment 22 and edge referencing surfaces 24 and 26. The surface 24 consists of a substantially vertically extending reference flat or sector located at a known fixed horizontal distance $a$, left or right, from the center 28 of the upper edge or segment line 30 of the segment 22. The surface 26 comprises a substantially horizontally extending reference flat or sector located at a known fixed vertical distance $b$ from the segment line 30. This surface 26 is also accurately angled with respect to the segment line 30 and, in the illustrated embodiment, this angle is zero and the surface 26 is substantially parallel to the segment line 30. Further details of the lens blank 20, and in particular, details relating to its method of manufacture, may be obtained by reference to pending application S.N. 520,173.

The blocking apparatus 10 includes a frame having a surface 12 with a centering ring 14 mounted thereon. The centering ring 14 is positioned in parallel but spaced relation to the surface 12 and has a cylindrical opening 16 which opens to the surface 12. The cylindrical opening 16 defines a blocking cavity 18 and also a designated center on the surface 12 for the purposes hereinafter set forth.

The lens blank 20 is initially positioned on the surface 12 within the blocking cavity 18 as shown in the drawings. While in the illustrated embodiment the entire surface 12 is shown as being generally planar, it should be understood that the lens blank could be supported within the cavity 18 on other surfaces such as a circular ring or three points. The frame is provided with an adjustable height slide 32 having a straight abutment edge 34 which projects into the blocking cavity 18 and against which the reference flat 26 is adapted to abut. The slide 32 is adjustably mounted on the surface 12 and is provided with an index line 36 which is associated with a scale 38. The scale is suitably calibrated, such that when the index line 36 is at the "0" scale line, the vertical distance from the segment line 30 to the designated center in the cavity 18 is zero. As the index line 36 is moved along the scale 38, which may be conveniently calibrated in millimeters, a corresponding distance will be traversed above or below the segment line 30.

The frame of the blocking apparatus 10 also mounts a pair of rotatable eccentric circular cams 40 and 42. The cam 40 is used with the right eye lens blank and the cam 42 is used with the left eye lens blank. Each cam partially projects into the blocking cavity 18 and, as shown, the reference flat 24 is adapted to abut the cam 40. Each cam is provided with a scale 44 which is associated with an index line 46 on the surface 12. When the cam 40 is rotated so that the zero scale line is opposite index line 46, the horizontal distance from the center of the segment line 30 to the designated center in the cavity 18 is zero. As the cam 40 is rotated causing a different line on the scale 44 to be opposite the index line 46, the distance from the center of the segment line 30 to the designated center is displaced a corresponding amount. In this manner, the intended optical center and/or mechanical center positions may be mechanically located with respect to the segment 22 by simply employing the edge referenced flats 24 and 26 on the blank 20 and the adjustable height slide 32 and the eccentric circular cam 40.

Figure 11:
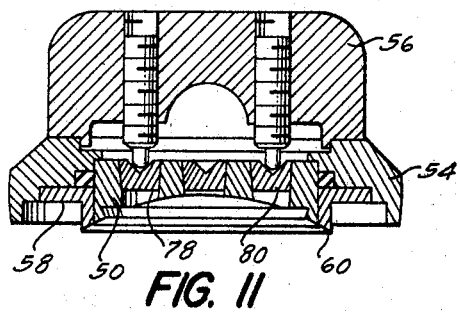
FIG. 11 is a view similar to FIG. 7 but showing the lens block positioned in the holder.
Figure 8:
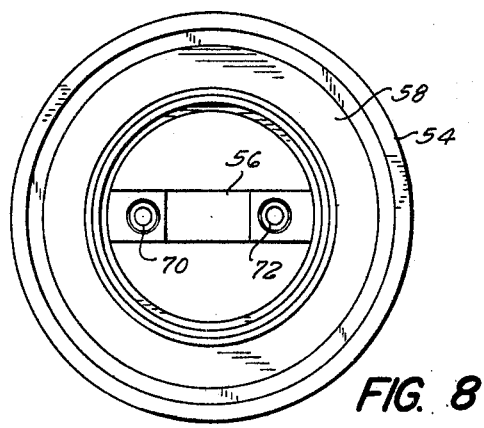
FIG. 8 is a bottom plan view of the block holder.

When the blank 20 is positioned with respect to the height slide 32 and cam 40 according to the prescription, the lens block 50 is placed inside the block holder 52. The block holder 52 comprises a lower circular ring 54 and an upper handle 56 which is suitably connected across the top of the ring. A gasket 58 is positioned in the internal opening of the ring 54 which has a downwardly extending locating edge 60. The outer circumference of the ring 54 includes a conical surface portion 62 and a portion 64 which is a segment of a sphere, the center of which closely coincides with the axis of the blocking cavity 18 and with the upper surface of the lens blank 20 when the device is fully assembled as hereinafter further described. The block 50 which may be of any conventional configuration has an outer diameter which closely corresponds to the internal diameter of the gasket 58. The block 50 may thereby be positioned in the holder 52 as seen in FIG. 11 to form a unitary structure.

Figure 5:
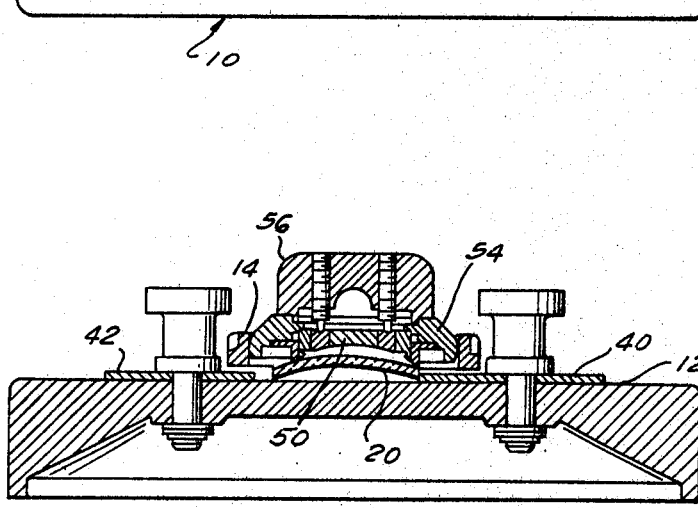
FIG. 5 is a sectional view of the blocking apparatus taken along the line 5—5 of FIG. 4, but additionally showing the centering ring, block holder, and block in assembled relationship.
Figure 6:
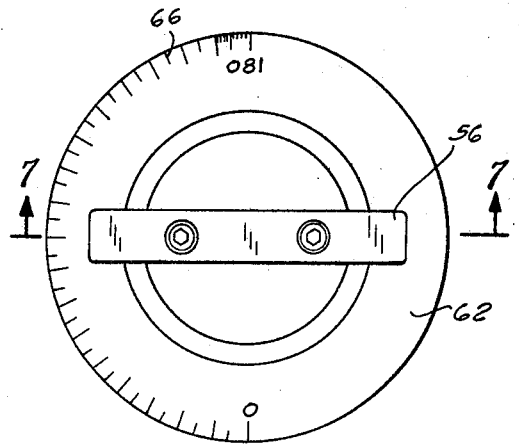
FIG. 6 is a top plan view of the block holder.
Figure 9:
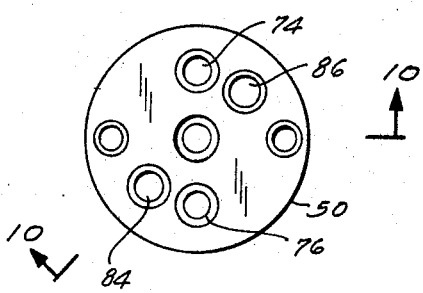
FIG. 9 is a top plan view of the lens block.
Figure 10:
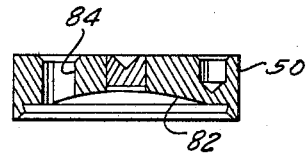
FIG. 10 is a sectional view taken along the line 10—10 of FIG. 9.
Figure 7:
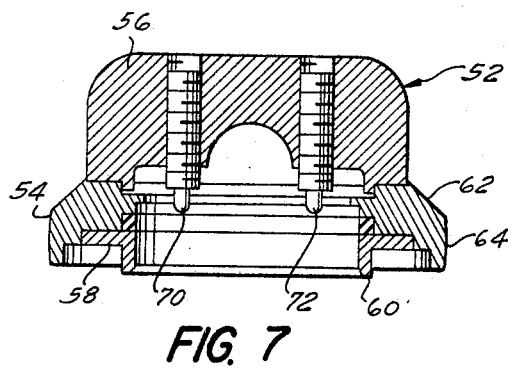
FIG. 7 is a sectional view taken along the line 7—7 of FIG. 6.

The assembly of the block 50 and block holder 52 is then lowered into the blocking cavity 18 as illustrated in FIG. 5. The block holder 52 is adapted to cause the center of the lens block 50 to correspond to the designated center of the blocking cavity 18 and thereby also with the center of the segment line 30 when the index lines 36 and 46 are at the zero scale lines on scales 38 and 44. As the prescription dimensions are introduced by means of the slide 32 and cam 40, the center of the block 52 will be offset from the center of the segment line 30 a corresponding amount. The portion 64 on the periphery of the block holder 52 has substantially the same diameter as the wall of the cylindrical opening 16, thus allowing the holder 52 to tip or pivot about its center within the blocking cavity 18. This ability to pivot within the blocking cavity 18 allows the holder 52 to maintain a close fit with the inner diameter of the opening 16 and to maintain the locating edge 60 properly seated upon the lens blank 20, regardless of the amount of height adjustment and decentration of the blank 20 introduced by the height slide 32 and centering cam 40. The holder 52 is also vertically adjustable to accept lens blanks of various thicknesses.

One block 50 may be employed for producing the prescribed optical surface on the lens blank 20, and another block of appropriate form may then be employed for the purpose of performing the final edging operation according to the prescription on the blank 20. For the surfacing operations, the optical center would be located by proper settings of the slide 32 and cam 40. For the final edging operation the mechanical center would similarly be located by means of the slide 32 and cam 40.

The block holder 52 is provided with an angularly divided scale 66 on the conical surface 62. The scale 66 is used to determine the prescribed cylinder or horizontal axis alignment in relation to a designated direction within the blocking cavity 18, which in the illustrated embodiment corresponds to the direction of the segment line 30 as well as the direction of the abutment edge 34. The scale 66 is suitably calibrated in degrees and is adapted to be compared with the index 68 on the upper surface of the centering ring 14.

The prescribed cylinder or horizontal axis alignment is introduced by a number of cooperating elements in the holder 52 and block 50. In accordance with the illustrated example, the holder 52 includes a pair of downwardly extending spring loaded pins 70 and 72 which are mounted in the upper handle 56. A plane passing through the axes of these pins will pass through the center of the holder 52 and the axis of the block 50. The block 50 includes a complementary pair of recesses 74 and 76 for receiving the ends of the pins 70 and 72 respectively. These recesses 74 and 76 are conveniently provided by means of the plug inserts 78 and 80. The axes of the recesses define a plane that will be seen to coincide with the plane defined by the axes of the pins 70 and 72 when the block 50 is inserted into the holder 52 and properly oriented. Under these circumstances, rotation of the block holder 52 will cause a corresponding rotation of the block 50 to thereby introduce the prescribed axis alignment.

In accordance with the illustrated example of the block 50, a hollowed cavity 82 is provided at the bottom surface of the block 50 for the reception of a suitable adhesive for securing the block to the blank 20. The bonding material may be introduced into the cavity 82 through the pouring holes 84 and 86 which are provided in the block 50. The adhesive may be injected into one of the two holes in the block from a suitable syringe 90 as shown in FIG. 3. The adhesive may be pitch or a low melting point alloy, such as an antimony lead compound, which hardens rapidly following pouring.

The lower surface of the locating edge 60 of the holder 52 rests upon the blank 20 and serves to position the block 50 suitably with respect to the lens blank. The edge 60 is highly polished and thus further serves to assure the retention of the bonding material between the block 50 and the blank 20 by providing an unbroken circular edge of contact between the two.

Thus, in this manner, a properly and accurately positioned block is secured on a blank for purposes of producing the prescribed optical properties on the lens blank. Another block positioned in a similar manner may subsequently be applied following removal of the block 50 for positioning the blank during the final edging operation. This subsequently applied block may then be employed to produce the desired final geometrical configuration of the finished lens.

It will now be appreciated that the prescription shop need only utilize the referencing means provided by the manufacturer to automatically and accurately locate the optical and mechanical centers and cylinder and horizontal axes on the blank in producing the optical and geometrical properties dictated by the prescription. The error prone visual alignment procedures formerly employed are no longer required.

Although a somewhat preferred embodiment of this invention has been disclosed and described in detail herein, it should be understood that this invention is in no sense limited thereby.

I claim:

1. An apparatus for blocking a lens blank having referencing means comprising,
  a frame having means for supporting the lens blank, said supporting means having a designated center and a designated direction thereon,
  means on said frame to engage the referencing means of said lens blank to accurately position said blank on said supporting means in relation to said designated center and to accurately orient said lens in relation to said designated direction,
  means for positioning a lens block immediately above said lens blank and accurately positioned in relation to said designated center,
  and means to accurately orient said lens block in a predetermined relationship with said designated direction.

2. In an apparatus for blocking a lens blank, the combination comprising,
  a spectacle lens blank having a reading segment thereon, and reference edge surfaces on the blank in predetermined relationship with respect to said segment,
  an apparatus including a frame having a surface for supporting said blank, said supporting surface having a designated center and designated direction thereon,
  means on said frame to engage said reference edge surfaces of said lens blank to accurately position said blank on said supporting surface in relation to said designated center and to accurately orient said lens in relation to said designated direction,
  means for positioning a lens block immediately above said lens blank and accurately positioned in relation to said designated center,
  and means to accurately orient said lens block in a predetermined relationship with said designated direction.

3. The combination as defined in claim 2 wherein the reading segment of said lens blank includes an upper edge and the reference edge surfaces include a substantially vertically extending peripheral flat sector at a predetermined horizontal distance from the center of the upper edge of said segment and a substantially horizontally extending peripheral flat sector at a predetermined vertical distance from the upper edge of said segment with the substantially horizontally extending sector being at a predetermined angle with respect to said segment.

4. The combination as defined in claim 3 wherein the means on said frame to engage said reference edge surfaces of said blank comprises a height slide having a straight abutment surface disposed in said designated direction to abut said horizontally extending flat sector of said blank, and an eccentric circular cam to abut said vertically extending flat sector of said blank.

5. In the manufacture of a lens to be finished according to prescription, the steps comprising,
  providing a lens blank having a reading segment thereon,
  forming edge reference surfaces on the blank at a predetermined distance from said segment and at a predetermined angular relationship with respect to said segment,
  placing said blank on a supporting means having a designated center and designated direction thereon, and engaging said edge reference surfaces to orient said lens at a predetermined distance from said center and at a predetermined angular relationship with respect to said designated direction, whereupon said reading segment is accurately indexed with respect to said designated center.

6. The invention in accordance with claim 5 comprising the further steps of positioning a block above said blank centered about said designated center and at a predetermined angular relationship with respect to said designated direction, and securing said block to said blank, whereupon the block is accurately indexed with respect to said reading segment.

References Cited

UNITED STATES PATENTS

| | | |
|---|---|---|
| 1,931,477 | 10/1933 | Allen. |
| 2,723,514 | 11/1955 | Lucker _____ 51—277 |
| 2,859,568 | 11/1958 | Dantzic _____ 51—277 X |
| 3,049,766 | 8/1962 | Buckminster. |
| 3,050,860 | 8/1962 | Kosh. |
| 3,226,887 | 1/1966 | Rudd et al. |

WILLIAM D. MARTIN, Jr., Primary Examiner

U.S. Cl. X.R.

33—174; 51—277